United States Patent [19]

Suga

[11] Patent Number: 5,604,276
[45] Date of Patent: Feb. 18, 1997

[54] RECORDING LIQUID AND METHOD FOR INK JET RECORDING USING SAME

[75] Inventor: Yuko Suga, Tokyo, Japan

[73] Assignee: Canon Kabushiki Kaisha, Tokyo, Japan

[21] Appl. No.: 353,992

[22] Filed: Dec. 6, 1994

Related U.S. Application Data

[63] Continuation of Ser. No. 40,584, Mar. 31, 1993, abandoned, which is a continuation of Ser. No. 652,216, Feb. 5, 1991, abandoned, which is a continuation-in-part of Ser. No. 459,267, Dec. 29, 1989, abandoned.

[30] Foreign Application Priority Data

| Jan. 7, 1989 | [JP] | Japan | 1-001532 |
| Jan. 7, 1989 | [JP] | Japan | 1-001533 |
| Jan. 7, 1989 | [JP] | Japan | 1-001534 |
| Nov. 27, 1989 | [JP] | Japan | 1-308329 |
| Nov. 27, 1989 | [JP] | Japan | 1-308330 |
| Nov. 27, 1989 | [JP] | Japan | 1-308331 |

[51] Int. Cl.$^6$ ................................................ C08K 5/3492
[52] U.S. Cl. ..................... 524/100; 524/193; 524/427; 523/160; 106/22 H; 106/23 H
[58] Field of Search ............ 106/22, 23; 523/160; 524/100, 193, 427

[56] References Cited

U.S. PATENT DOCUMENTS

| 3,687,887 | 8/1972 | Zabiak | 260/29.6 |
| 4,281,329 | 1/1981 | Yano et al. | 106/23 |
| 4,557,761 | 12/1985 | Kobayashi et al. | 106/22 |
| 4,597,794 | 7/1986 | Ohta et al. | 106/20 |
| 4,724,001 | 2/1988 | Ohta et al. | 106/22 |
| 4,836,852 | 6/1989 | Knirsch et al. | 106/23 |

FOREIGN PATENT DOCUMENTS

| 0267677 | 5/1988 | European Pat. Off. . | |
| 2100449 | 3/1972 | France . | |
| 2537150 | 6/1984 | France . | |
| 1053373 | 3/1986 | Japan | 106/23 |
| 1053372 | 3/1986 | Japan | 106/23 |

*Primary Examiner*—Kriellion S. Morgan
*Attorney, Agent, or Firm*—Fitzpatrick, Cella, Harper & Scinto

[57] ABSTRACT

A recording liquid comprises at least one of certain specified dyes carbon black, a water-soluble resin, a water-soluble organic solvent and water. The organic solvent includes polyhydric alcohol and/or its alkyl ether and an aliphatic monohydric alcohol. The water-soluble resin has an acid value of 50 to 300. The amount of the dissolved water-soluble resin is not more than 2% by weight. A method for ink jet recording comprises ejecting the recording liquid as liquid droplets from fine orifices by endowing the recording liquid with heat energy.

35 Claims, 2 Drawing Sheets

RECORDING LIQUID AND METHOD FOR INK JET RECORDING USING SAME

This application is a continuation of application Ser. No. 08/040,584 filed Mar. 31, 1993, now abandoned, which is a continuation of application Ser. No. 07/652,216 filed Feb. 5, 1991, now abandoned, which in turn is a continuation-in-part of application Ser. No. 07/459,267, filed Dec. 29, 1989, now abandoned.

BACKGROUND OF THE INVENTION

1. Field of the Invention

This invention relates to a recording liquid particularly suitable for an ink jet printer and a method for ink jet recording by allowing a recording liquid to fly from the orifices of a recording head by an action of heat energy.

2. Related Background Art

The ink jet recording system has such advantages as less generation of noises during the recording, easy response to colorization and high speed recording of images with a high resolution owing to the use of a highly integrated head. In the ink jet recording system, solutions of various water-soluble dyes in water or a mixture of water with an organic solvent have been used as inks. However, the water-soluble dyes themselves are poor in lightfastness, and thus the lightfastness of recorded images has been a problem in many cases. Furthermore, the waterfastness of recorded images has been also a problem in many cases due to the water solubility of the dyes. That is, recorded images are sometimes blurred or disappear when wetted with rain or sweat or splashed with water.

On the other hand, writing materials using a dye, such as ball-point pens, etc. have a similar problem, and in order to solve the problems of lightfastness and waterfastness, various aqueous pigment inks have been proposed for the writing materials. For practical applications of aqueous pigment inks, dispersion stability, prevention of inks from solidification at the tip of a pen, and prevention of balls of ball point pens from wearing have been investigated. For example, Japanese Patent Application Kokai (Laid-open) No. 61-246271 discloses an ink composition for writing materials with improved dispersion stability and drying resistance by using a water-soluble amine salt, ammonium salt or metal salt of copolymers comprising a hydrophilic, addition-polymerizable monomer and styrene and/or styrene derivative monomer as a water-soluble resin, and Japanese Patent Application Kokai (Laid-open) No. 62-72774 discloses an aqueous pigment ink free from an ejection-down phenomenon and an ink runout phenomenon by using polysiloxane.

When a conventional pigment ink using carbon black is used in the ink jet recording, the fastness of a printed product can be considerably improved, as compared with those when a dye ink is used, as mentioned above, but it was found by the successive investigation that there was such an inconvenience that the optical density of the printed product obtained with carbon black as one of characteristics of ink jet recording was inferior to that of the printed product obtained with a dye ink. In order to increase the optical density of printed products, it would have been taken into consideration to increase the concentration of pigment, but a pigment ink of high concentration had such a disadvantage as causing a serious trouble in the ejection stability. Furthermore, in the application of such a dispersion system as a pigment ink to the ink jet recording, prevention of the ink from solidification at the head tip end when left standing for a prolonged time was an important technical task and the ink composition was an important point in designing of reliable pigment inks.

Still furthermore, some of the conventional pigment inks had such problems as unstable ejection or ultimately a failure to discharge when the driving conditions for a recording head were changed or when the ink was continuously ejected for a long time, though it had good ejection characteristics for a relatively short time.

SUMMARY OF THE INVENTION

An object of the present invention is to provide a recording liquid capable of being always stably ejected even if the driving conditions are changed or even if ejection is carried out for prolonged ejection time, and also to provide a method for ink jet recording using the recording liquid, while solving the problems of the prior art as described before.

Another object of the present invention is to provide a recording liquid capable of producing a recorded image with a good fastness, particularly high waterfastness and lightfastness, at a high optical density.

These objects of the present invention can be attained by a recording liquid which comprises carbon black, a water-soluble resin, which is preferred to have an acid value of 50 to 300 a water-soluble organic solvent containing polyhydric alcohol and/or its alkyl ether and an aliphatic monohydric alcohol, and water, where the amount of the dissolved water-soluble resin is not more than 2% by weight, and the recording liquid contains at least one of dyes represented by the following general formulae (A) to (C):

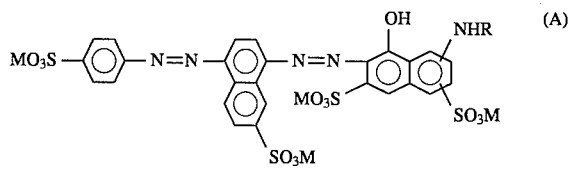

wherein R is —H, —COCH₃,

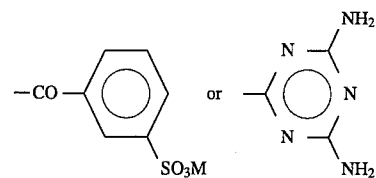

and M is Na, Li, K or ammonium;

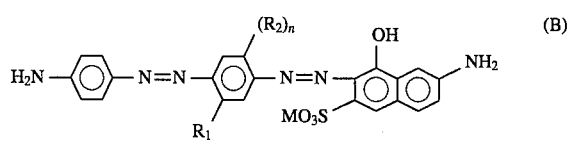

wherein R₁ and R₂ are groups selected from —OCH₃, —CH₃, —NH₂ and —NHCOCH₃, n is 0 or 1 and M is Na, Li, K or ammonium; and

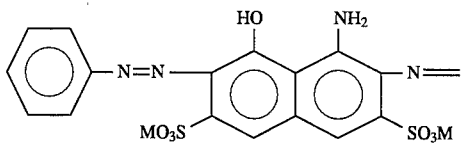

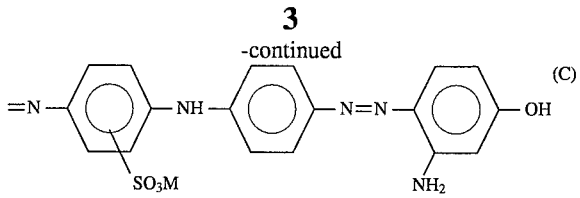

(C)

wherein M is Na, K, Li or ammonium.

The present invention furthermore provides a method for ink jet recording which comprises ejecting a recording liquid as liquid droplets from fine orifices by endowing the recording liquid with heat energy.

DETAILED DESCRIPTION OF THE PREFERRED EMBODIMENTS

Figure 1A:
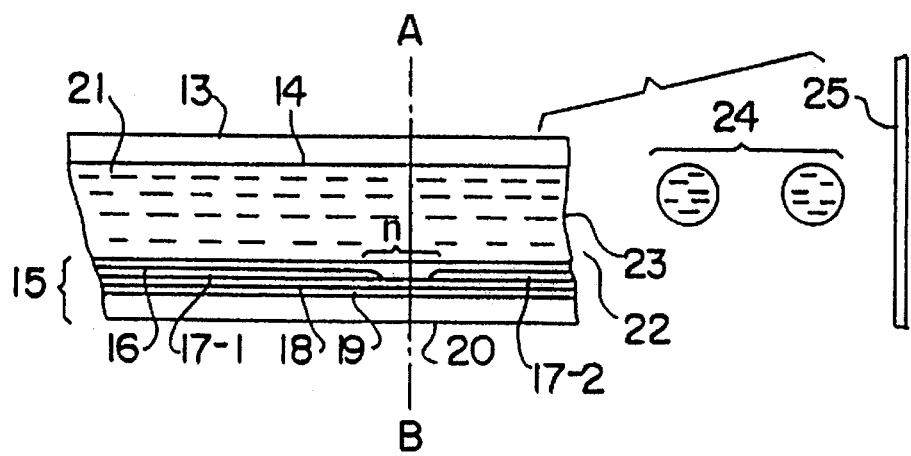
FIG. 1A and FIG. 1B are respectively a longitudinal cross-sectional view and a lateral cross-sectional view of a head portion of an ink-jet recording apparatus.

The present recording liquid has properties particularly suitable for an ink jet printer using heat energy.

An ink jet recording system using heat energy utilizes a bubbling phenomenon due to the boiling of a recording liquid film on a thin film, heat-generating resistor as a source for generating a ejection energy and is practically realized, with a dye-containing ink. In this system, it is predicted that the ink layer on the thin film, heat-generating resistor reaches a maximum attainable temperature of 200° C. to 300° C. or higher only for a very short time such as 3 μsec to 12 μsec per signal. Thus, the heat stability of the ink is a very important condition for the ejection stability.

As a result of investigations of causes of serious ejection troubles when a pigment ink as proposed for the writing material was used as such in the ink jet recording based on heat energy, the present inventors have found several causes, one of which is formation of deposits on the thin film, heat-generating resistor due to the action of heat When pulses are applied to the ink for writing materials, resulting in incomplete bubbling of the ink and consequent ejection disturbance or occurrences of ejection failure. Even if no deposits are formed on the thin film resistor, there can be an ejection failure of ink droplets due to incomplete bubbling and incomplete response to the applied pulses. That is, in order to stably eject the ink from the orifice tip ends, the ink must have such properties that the ink bubbles in a desired volume on the thin film, heat-generating resistor, and that bubbling and debubbling can repeat at desired time intervals. The conventional ink for the writing materials has no such properties that various inconveniences as mentioned above occur during the recording upon filling the ink in an ink jet recording apparatus.

As a result of extensive studies of properties of aqueous pigment inks such as heat stability and optimum bubbling, the present inventors have found that a recording liquid containing not more than 2% by weight, preferably not more than 1% by weight, of a water-soluble resin not adsorbed on a pigment and at least one of polyhydric alcohol and its alkyl ether, and aliphatic monohydric alcohol as water-soluble organic solvents can exactly bubble under any driving conditions on the thin film, heat-generating resistor without any formation of deposits on the heat-generating resistor even over a long period of time.

Furthermore, the present inventors have found that the afore-mentioned dye must be contained in the recording liquid in order to increase the optical density of printed images while maintaining the stable ejection, and have established the present invention.

The dissolved water-soluble resin as referred to herein means a resin in a solution state in a liquid medium without being adsorbed on the pigment in the recording liquid.

The present invention will be described in detail below.

Carbon black for use in the present invention is not only commercially available ones but also carbon black surface-treated with a surfactant, a polymeric dispersant, or the like, graft carbon, etc. The content of carbon black depends upon its structure, and is in the range of 3 to 20% by weight, preferably 3 to 12% by weight on the basis of the total weight of the recording liquid.

As a dispersant, a water-soluble resin applicable to pigment dispersion can be used. Such a water-soluble resin is a resin having an acid value of 50 to 300, preferably 70 to 250.

Coupling of a pigment with a water-soluble resin is a hydrophobic coupling. When the acid value of the resin is higher, that is, when the hydrophilic property is too strong, the resin is not adsorbed on the pigment surface in a manner as desired, and the unadsorbed resin content of the pigment solution is increased. When the acid value of the resin is too low, that is, when the hydrophilic property is weak, the resin becomes insoluble in water.

The acid value of the resin as referred to herein is the necessary amount of KOH (mg) for neutralizing the resin.

The resin for used in the present invention may be any resin soluble in an aqueous solution of amine, and includes, specifically, natural polymers such as lignin sulfonate, shellac, etc., polyacrylic acid, styrene-acrylic acid copolymer, styrene-acrylic acid-acrylic acid alkyl ester copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid half ester copolymer, vinylnaphthalene-acrylic acid copolymer, vinylnaphthalene-maleic acid copolymer or their salts, and anionic polymers such as sodium salt, phosphate, etc. of β-naphthalene-sulfonic acid-formalin condensate.

The content of the water-soluble resin depends on the species of a pigment and a water-soluble resin to be used and is such that the amount of water-soluble resin not adsorbed on the pigment in the recording liquid is not more than 2% by weight, preferably not more than 1% by weight and the ratio of the pigment to the water-soluble resin by weight is 3:2 to 10:1, preferably 3:1 to 10:1, more preferably 10:3 to 10:1.

The polyhydric alcohol and/or its alkyl ether for use in the present invention include, for example, polyalkylene glycols such as polyethylene glycol, polypropylene glycol, etc.; alkylene glycols having an alkylene group of 2 to 6 carbon atoms such as ethylene glycol, propylene glycol, butylene glycol, triethylene glycol, 1,2,6-hexanetriol, thiodiglycol, hexylene glycol, diethylene glycol, etc.; glycerine; lower alkyl ethers of polyhydric alcohols such as ethylene glycol monomethyl (or ethyl) ether, diethylene glycol methyl (or ethyl) ether, triethylene glycol monomethyl (or ethyl) ether, etc.

The content of the polyhydric alcohol and/or its alkyl ether is in the range of 10 to 50% by weight, preferably 20 to 40% by weight. Below 10% by weight, it is not satisfactory to prevent clogging at the nozzle tip ends, whereas above 50% by weight printing quality of printed product is lowered.

The aliphatic monohydric alcohol for use in the present invention includes, for example, alkyl alcohols of 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol, etc., among which ethyl alcohol is particularly preferable because it can considerably increase the ejection stability of the recording liquid.

The content of aliphatic monohydric alcohol is in the range of 3 to 15% by weight, preferably 3 to 10% by weight, and below 3% by weight no stable ejection can always be obtained against changes in the driving conditions for a printer, whereas above 15% by weight the printing quality of printed product is lowered.

The content of water is in the range of 10 to 60% by weight, preferably 10 to 50% by weight.

The dye represented by the general formula (A) for use in the present invention is a dye with a good coloration, and includes the following compounds as preferable examples:

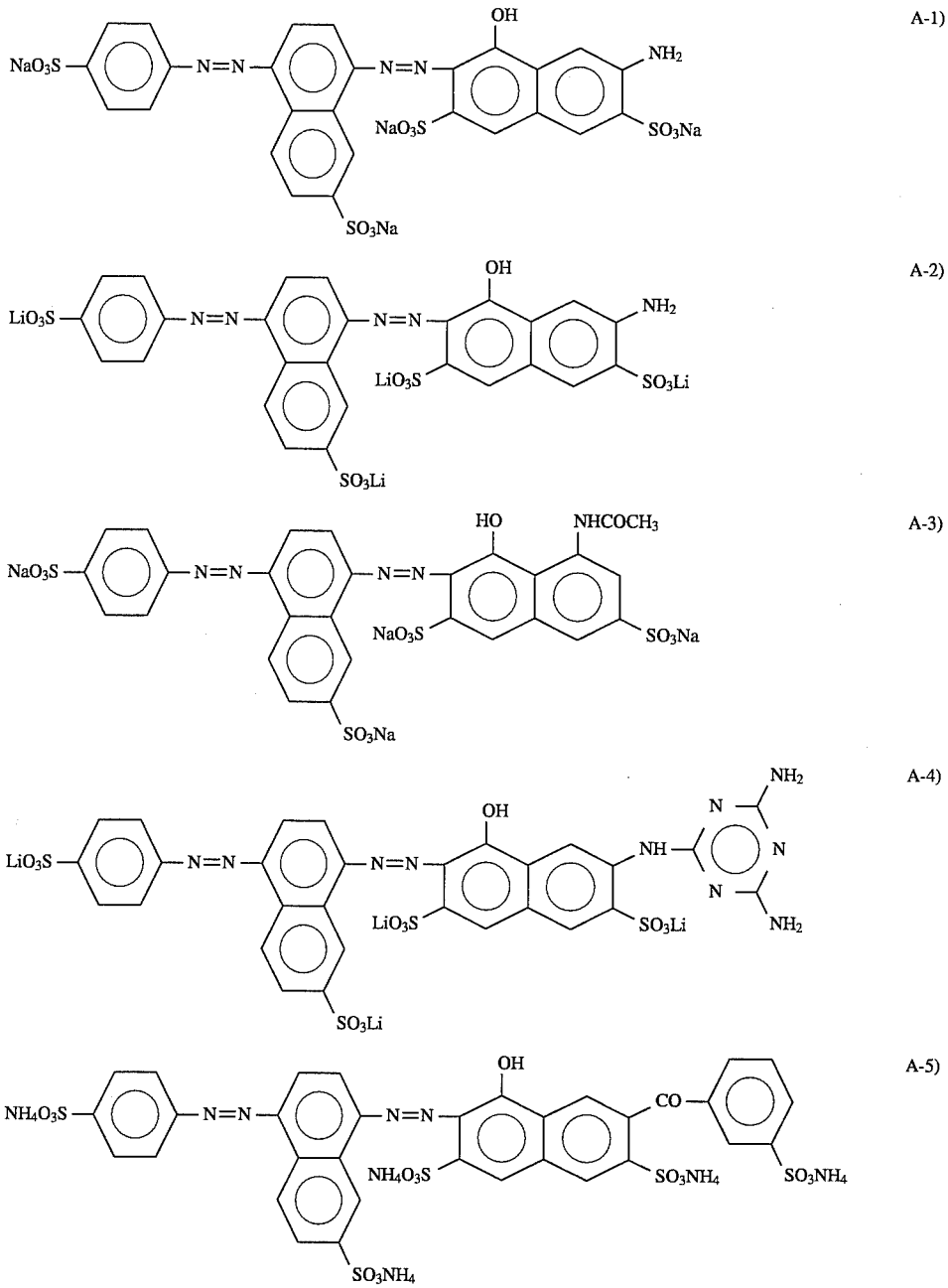

The dye represented by the general formula (A) can be prepared according to the following procedure:

A compound of the following formula ($a_1$) was stirred in dilute hydrochloric acid to obtain a uniform slurry. Then, ice was added to the slurry to cool it. An aqueous sodium nitrite solution was added to the slurry and the mixture was stirred at 3° C. for 3 hours to make diazotization. Then, solfamic acid was added thereto to eliminate the remaining sodium nitrite and obtain a diazo solution.

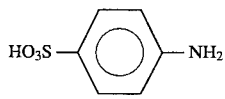
(a1)

Then, a compound of the following general formula (b$_1$) was dissolved in water to obtain a uniform slurry. Then, sodium hydroxide, ice and the thus obtained diazo solution were added thereto and coupling was carried out at 3° C. and a pH of 2 to 3.

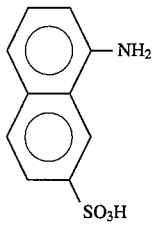
(b$_1$)

Then, sodium chloride was added thereto to make salting-out. The precipitates were recovered by filtration and dried to obtain a monoazo compound represented by the following formula (c$_1$).

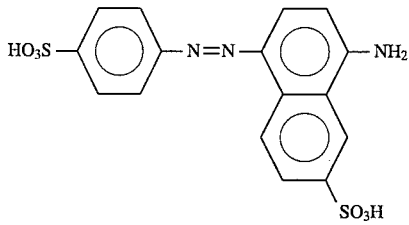
(c$_1$)

The thus obtained monoazo compound was stirred in dilute hydrochloric acid to obtain a uniform slurry and then ice was added thereto to cool the slurry. An aqueous sodium nitrite solution was added to the slurry and the mixture was stirred at 3° C. for 3 hours to make diazotization. Then, sulfamic acid was added thereto to eliminate the remaining sodium nitrite to obtain a diazo solution.

Then, a compound of formula (d$_1$) was dissolved in water, and ice, the thus obtained diazo solution and sodium hydroxide were added thereto and coupling was carried out in a weakly alkaline state at a temperature of 2° to 5° C.

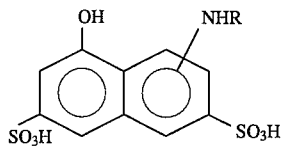
(d$_1$)

After thorough stirring under the same conditions as above, sodium chloride was added thereto to make salting-out. The precipitates were recovered by filtration and dried to obtain a disazo compound represented by the following formula (e$_1$).

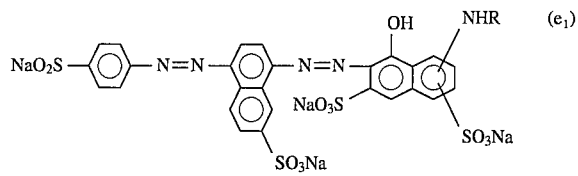
(e$_1$)

The dye represented by the general formula (B) for use in the present invention is a dye with a good coloration and includes the following compounds as preferable examples:

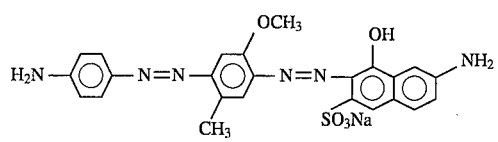
B-1)

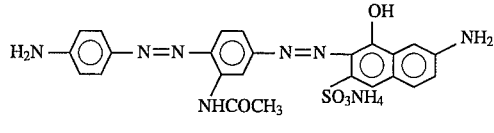
B-2)

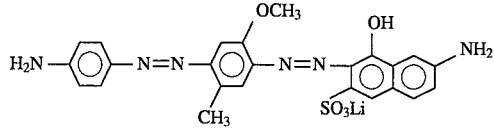
B-3)

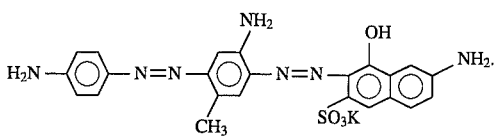
B-4)

The dye represented by the general formula (B) can be prepared according to the following procedure:

A compound of the following formula (a$_2$) was stirred in dilute hydrochloric acid to make a uniform slurry. Then, ice was added thereto to cool the slurry.

An aqueous sodium nitrite solution was added to the slurry, and the mixture was stirred at 3° C. for 3 hours to make diazotization. Then, sulfamic acid was added thereto to eliminate the remaining sodium nitrite and obtain a diazo solution.

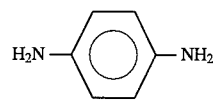
(a2)

Then, a compound of the following formula (b$_2$) was dissolved in water to make a uniform slurry. Then, sodium hydroxide, ice and the thus obtained diazo solution were added thereto, and coupling wag carried out at 3° C. and a pH of 2 to 3.

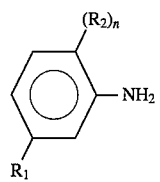
(b$_2$)

Then, sodium chloride was added thereto to make salting-out. The precipitates were recovered by filtration and dried to obtain a monoazo compound represented by the following formula ($c_2$).

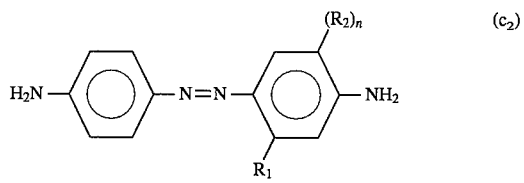

The thus obtained monoazo compound was stirred in dilute hydrochloric acid to make a uniform slurry and then ice was added thereto to cool the slurry. An aqueous sodium nitrite solution was added to the slurry and the mixture was stirred at 3° C. for 3 hours to make diazotization. Then, sulfamic acid was added thereto to eliminate the remaining sodium nitrite and obtain a diazo solution.

A compound of the following formula ($d_2$) was dissolved in water, and ice, the thus obtained diazo solution and sodium hydroxide were added thereto, and coupling was carried out in a weakly alkaline state at a temperature of 2° to 5° C.

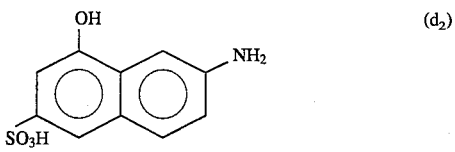

After thorough stirring under the same conditions as above, sodium chloride was added thereto to make salting-out. The precipitates were recovered by filtration and dried to obtain a disazo compound represented by the following formula (B).

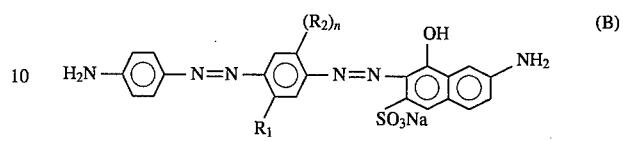

The dye represented by the general formula (C) for use in the present invention is a dye with a good coloration and includes the following compounds as preferable examples.

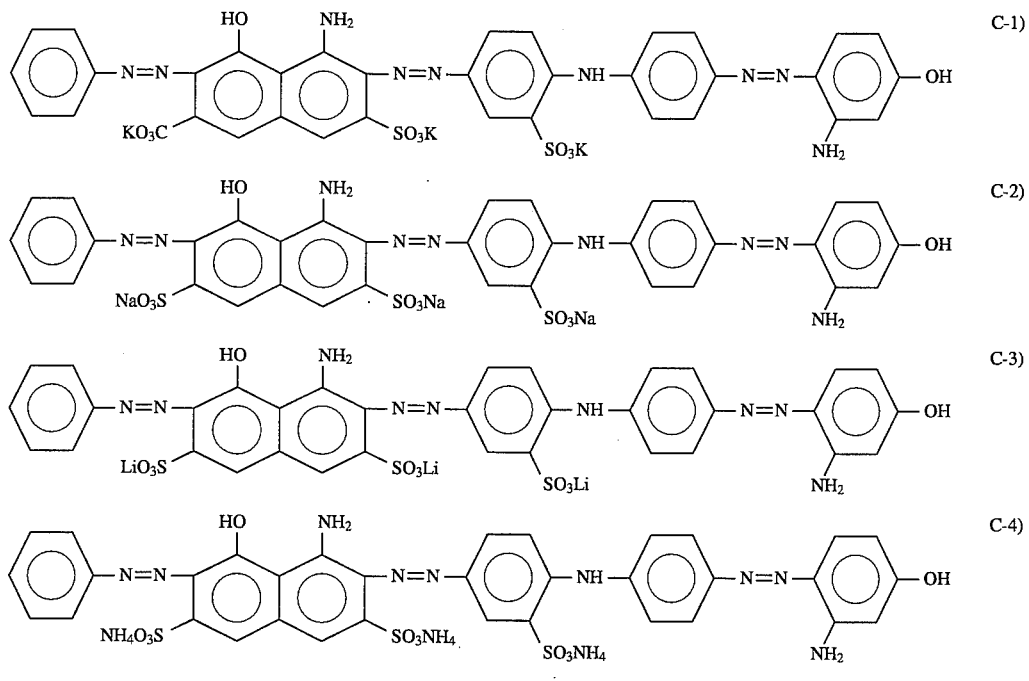

The dye represented by the general formula (C) can be prepared according to the following procedure:

An amine represented by the following general formula (I):

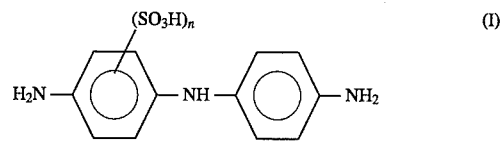

where m and n have the same meanings as defined before, was diazotized in a mineral acid such as hydrochloric acid or sulfuric acid with sodium nitrite, etc., and then coupled with a compound of the following general formula (II) to obtain a compound of the following general formula (III).

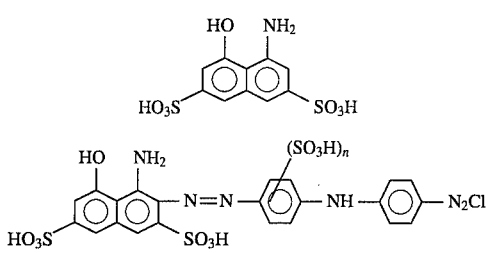

An amine represented by the following general formula (IV):

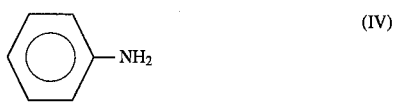

was diazotized in a mineral acid such as hydrochloric acid or sulfuric acid with sodium nitrite, etc. and then coupled with the amine represented by the general formula (III) to obtain a compound of the following general formula (V).

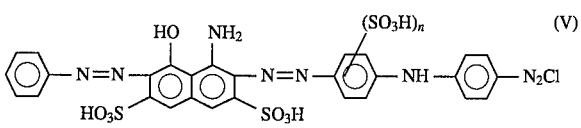

Then, the compound of the general formula (V) was coupled with a compound of the following general formula (VI) to obtain a desired compound of the following general formula (VII).

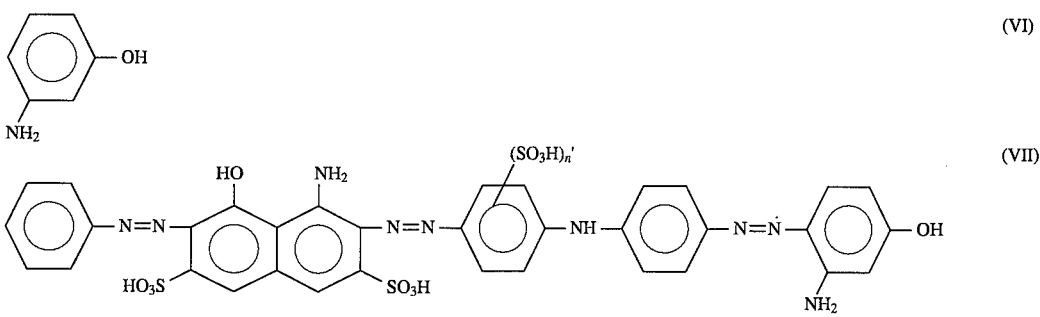

In the foregoing procedure, the group $SO_3H$ in the individual compounds may be in the form of an alkali metal salt, an ammonium salt or an organic amine salt, depending on the conditions.

The content of the dye represented by the general formulae (A) to (C) is in the range of 0.5 to 2.0% by weight on the basis of the total weight of the recording liquid, and below 0.5% by weight no effect as a coloring agent is obtained, whereas above 2.0% by weight fastness, particularly water resistance and light resistance, of the printed product is lowered.

Among the dyes represented by the foregoing general formulae (A) to (C), the dye of the general formula (A) is preferable because of a high color value, a very good preservation stability and a very small influence upon liquid-contacting members.

The main components constituting the present recording liquid are as described above, and may further contain, if required, a water-soluble organic solvent, a surfactant, a pH controller, antiseptics, etc.

The water-soluble organic solvent applicable to the present recording liquid includes, for example, amides such as dimethylformamide, dimethylacetamide, etc.; ketones and ketoalcohols such as acetone, diacetone alcohol, etc.; ethers such as tetrahydrofuran, dioxane, etc.; N-methyl-2-pyrrolidone, 1,3-dimethyl-2-imidazolidinone, etc.

The surfactant applicable to the present recording liquid includes, for example, anionic surfactants such as fatty acid salts, higher alcohol sulfate ester salts, liquid fat-oil sulfate ester salts, alkylarylsulfonate salts, etc., and nonionic surfactants such as polyoxyethylene alkylethers, polyoxyethylene alkylesters, polyoxyethylene sorbitan alkylesters, etc. and one or more of them may be used if desired. The amount of the surfactant is desirably 0.01 to 5% by weight on the basis of the total weight of the recording liquid, though dependent on the species of the surfactant. In that case, the amount of the surfactant to be added is preferably determined so that the surface tension of the recording liquid may be 35 dyne/cm or more, because when the recording liquid has a lower surface tension than 35 dyne/cm, unpreferable states such as misregistration in printing due to the wetting of nozzle tip ends (deviation of the recording liquid droplets from the target point on the recording sheet), etc. are brought about in the recording system as in the present invention.

The pH controller applicable to the present recording liquid includes, for example, various organic amines such as diethanolamine, triethanolamine, etc.; inorganic alkali agents such as alkali metal hydroxides, e.g. sodium hydroxide, lithium hydroxide, potassium hydroxide, etc.; organic acids and mineral acids.

The present recording liquid can be prepared by adding a pigment to an aqueous solution containing at least a dispersed resin, an amine and water, stirring the mixture, and then dispersing the mixture by a dispersing means, as will be described later, and optionally subjecting the mixture to centrifugation, thereby obtaining a desired dispersion. Then, a solution containing the above-mentioned components, where the dye is completely dissolved, is added to the thus obtained dispersion and the mixture is stirred to obtain a recording liquid.

In order to make the content of unadsorbed resin not more than 2% by weight, it is necessary to completely dissolve the resin in advance by stirring the solution containing the resin, the amine and water at 60° C. or higher for at least 30 minutes. Furthermore, it is necessary to add the amine thereto in an amount of at least 1.2 times the amount of amine calculated from the acid value of the resin to dissolve the resin. The amount of amine can be calculated according to the following equation:

Amount of amine (g) =

$$\frac{\text{(Acid value of resin)} \times \text{(molecular weight of amine)} \times \text{(amount of resin (g))}}{56,000}$$

Furthermore, it is necessary to premix the aqueous solution containing the pigment for at least 30 minutes before the dispersion treatment. The premixing can improve the wettability of the pigment surfaces and promote the adsorption of the resin onto the pigment surfaces.

Preferable amine to be added to the dispersion includes, for example, organic amines such as monoethanolamine, diethanolamine, triethanolamine and aminomethylpropanol, ammonia, etc.

Any usually applicable dispersing apparatus can be used in the present invention, for example, a ball mill, a roll mill, a sand mill, etc., among which high speed sand mills are preferable, including, for example, supermill, Sand grinder, Beads mill, Agitator mill, Grain mill, Daino mill, Pearl mill, Cobol mill, etc. (all of which are tradenames).

In the present invention, a pigment having a desired particle size distribution can be obtained by reducing the size of grinding media of the dispersing apparatus, increasing the packing ratio of grinding media, prolonging the treating time, lowering the ejection rate, or classifying the ground pigment through e.g., a filter or a centrifuge alone or in combination.

In the present invention, the amount of unadsorbed resin can be determined by precipitating the pigment and the resin adsorbed on the pigment by an ultracentrifuge, etc. and measuring the amount of the remaining resin contained in the supernatant solution by total organic carbon (TOC) meter or by a gravimetry (by evaporating the supernant solution to dryness and measuring the weight of the resin).

The present recording liquid is particularly suitable for an ink jet recording system which ejects liquid droplets by action of heat energy for recording, but, needless to say, can be also used for the ordinary writing materials.

The methods and the apparatus suitable for the use of the ink of the present invention are those which provide thermal energy to ink in a cell in a recording head in correspondence with recording signals to form liquid droplets by the thermal energy.

Figure 1B:
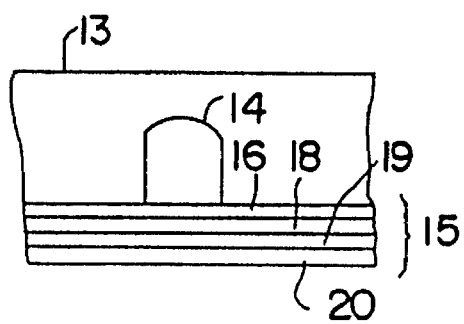
Figure 2:
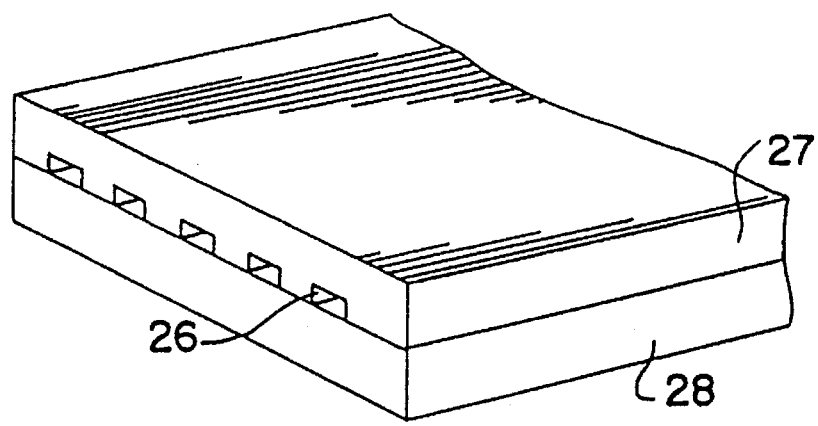
FIG. 2 is an oblique view of a multiple form of the head of FIG. 1.

An example of the constitution of the heads, which is a main portion of the apparatus, is shown in FIG. 1A, FIG. 1B, and FIG. 2.

A head 13 is formed by bonding a plate of glass, ceramics, or plastics having a groove 14 with a heat-generating head 15. The type of the head is not limited to the one shown in the figure. The heat-generating head 15 is constituted of a protection layer 16 formed of silicone oxide or the like, aluminum electrodes 17-1 and 17-2, a heat-generating resistance layer 18 formed of nichrome or the like, a heat accumulation layer 19, and a substrate plate 20 having a good heat-releasing property made of alumina or the like.

Ink 21 reaches the ejection orifice 22 (a fine pore), forming a meniscus by action of pressure P, not shown in the figure.

On application of an electric signal to the electrodes 17-1 and 17-2, the region designated by a symbol "n" on the heat-generation head 15 abruptly generates heat to form a bubble in the ink 21 at the position adjacent thereto. The pressure generated by the bubble pushes out the meniscus 23 and ejects the ink 21, as recording droplets 24, and the ink droplets fly to a recording medium 25. FIG. 2 illustrates a multi-head constructed by juxtaposing a multiple of heads shown in FIG. 1A. The multi-head is prepared by bonding a glass plate having multi-grooves with a heat-generation head 28 similar to the one described in FIG. 1A.

Incidentally, FIG. 1A is a cross-sectional view of the head 13 along an ink flow path, and FIG. 1B is a cross-sectional view of the head at the line A-B in FIG. 1A.

Figure 3:
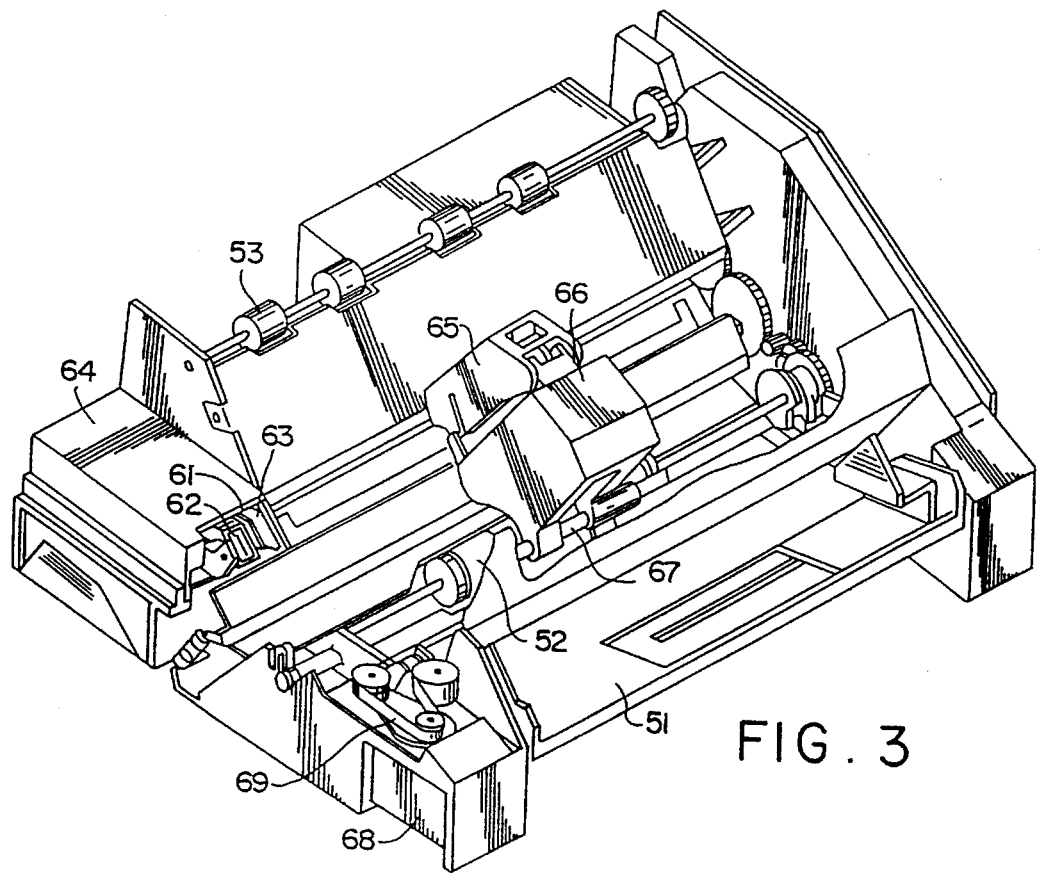
FIG. 3 is an oblique view of an ink-jet recording apparatus.

FIG. 3 illustrates an example of the ink-jet recording apparatus having such a head mounted therein.

In FIG. 3, a blade 61 as a wiping member is held at one end by a blade-holding member. The blade 61 is placed at a position adjacent to the recording region of the recording head, and in this example, is held in protrusion into the moving path of the recording head. A cap 62 is placed at a home position adjacent to the blade 61, and is constituted such that it moves in the direction perpendicular to the moving direction of the recording head to come into contact with the ejection nozzle face to cap the nozzles. An ink absorption member 63 is provided at a position adjacent to the blade 61, and is held in protrusion into the moving path of the recording head in a manner similar to that of the blade 61. The aforementioned blade 61, the cap 62 and the absorption member 63 constitute an ejection-recovery section 64, and the blade 61 and the absorption member 63 remove water, dust, and the like from the ink ejecting nozzle face.

A recording head 65 has an ejection energy generation means for ejection, and conducts recording by ejecting ink toward a recording medium opposing to the ejection nozzle face. A carriage 66 is provided for supporting and moving the recording head 65. The carriage 66 is engaged slidably with a guide rod 67. A portion of the carriage 66 is connected (not shown in the figure) to a belt 69 driven by a motor 68, so that the carriage 66 is movable along the guide rod 67 to the recording region of the recording head and an adjacent region thereto.

The constitution of a paper delivery portion 51 for delivery of a recording medium and a paper delivery roller 52 driven by a motor (not shown) in the figure delivers the recording medium to the position opposing to the ejecting nozzle face of the recording head, and the recording medium is discharged with the progress of the recording to paper discharge portion provided with paper-discharge rollers 53.

In the above constitution, the cap 62 of the ejection-recovery portion 64 is out of the moving path of the recording head 65, while the blade 61 is protruded toward the moving path. Therefore, the ejecting nozzle face of the recording head 65 is wiped therewith. The cap 62 moves to protrude toward the moving path of the recording head when the cap 62 comes into contact for capping with the ejecting nozzle face of the recording head.

At the time when the recording head moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 4:
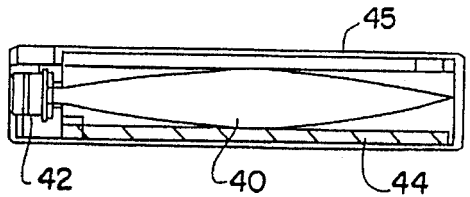
FIG. 4 is a longitudinal cross-sectional view of an ink cartridge.

FIG. 4 illustrates an example of the ink cartridge 45 containing ink to be supplied through an ink supplying member such as a tube (not shown). The ink container portion 40, for example an ink bag, contains an ink to be supplied, and has a rubber plug 42 at the tip. By inserting a needle (not shown in the figure) into the plug 42, the ink in the ink container portion 40 may be accessed. An absorption member 44 absorbs waste ink.

The ink container portion has preferably a liquid-contacting face made of polyolefin, especially polyethylene as in the present invention.

Figure 5:
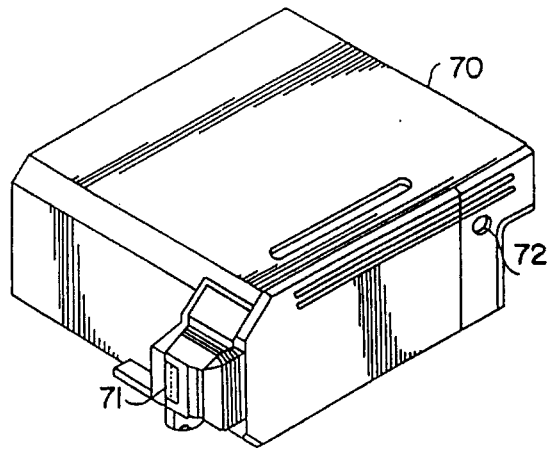
FIG. 5 is an oblique view of a recording unit.

The ink-jet recording apparatus used in the present invention is not limited to the above-mentioned one, which has separately a head and an ink cartridge, but integration thereof as shown in FIG. 5 may suitably be used.

In FIG. 5, a recording unit 70 houses an ink container portion such as an ink absorption member, and the ink in the ink absorption member is ejected from a head 71 having a plurality of orifices. The material for the ink absorption member is preferably polyurethane as in the present invention.

Air-communication opening 72 is provided to communicate the interior of the recording unit with the open air.

The recording unit 70 may be used in place of the recording head shown in FIG. 3, and is readily mountable to and unmountable from the carriage 66.

The present invention will be described in detail below, referring to Examples and comparative Examples, where parts are by weight.

EXAMPLE 1

Preparation of pigment dispersion

| | |
|---|---|
| Styrene-acrylic acid-ethyl acrylate copolymer (acid value: 175; average molecular weight: 12,000) | 5 parts |
| Monoethanolamine | 1.5 parts |
| Deionized water | 63.5 parts |
| Ethylene glycol | 5 parts |

The foregoing components were mixed together, heated at 70° C. on a water bath to completely dissolve the resin. When the concentration of the resin to be dissolved was low, the dissolution was sometimes incomplete, and thus a resin solution of high concentration may be prepared in advance and adjusted to a desired resin concentration upon dilution to attain complete dissolution of the resin.

Then, 20 parts of carbon black (MCF-88, made by Mitsubishi Kasei Kogyo Kabushiki Kaisha), and 5 parts of ethanol were added to the solution and the mixture was premixed for 30 minutes and then subjected to a dispersion treatment under the following conditions.

Dispersing apparatus: Pearl mill (made by Ashizawa Kabushiki Kaisha)

Grinding media: Glass beads

Packing ratio of grinding media: 50% (by volume)

Ejection rate: 100 ml/min

Then, the mixture was further subjected to a centrifugation treatment (12,000 rpm for 15 minutes) to remove coarse particles and obtain a dispersion.

Preparation of ink

| | |
|---|---|
| The thus obtained dispersion: | 40 parts |
| Dye (A-1) | 1.5 parts |
| Glycerine | 5 parts |
| Ethylene glycol | 3 parts |
| Deionized water | 46.5 parts |

The foregoing components excluding the dispersion were mixed together and stirred. After the complete dissolution of the dye, the predetermined amount of the dispersion was added thereto, and the mixture was stirred for one hour to obtain an ink.

EXAMPLE 2

A black ink was prepared in the same manner as in Example 1, except that dye (A-2) was used in place of the dye (A-1).

EXAMPLE 3

Preparation of pigment dispersion

| | |
|---|---|
| α-Methylstyrene-styrene-acrylic acid copolymer (acid value: 130; average molecular weight: 13,000) | 4 parts |
| Aminomethylpropanol | 2 parts |
| Deionized water | 65.2 parts |
| Diethylene glycol | 5 parts |
| Nikkol BL-9Ex (made by Nikko Chemicals Kabushiki Kaisha) | 0.5 parts |

The foregoing components were mixed together and heated at 70° C. on water bath to completely dissolve the resin. Then, 16 parts of carbon black (MA-100, made by Mitsubishi Kasei Kogyo Kabushiki Kaisha) and 7 parts of ethanol were added to the solution and premixed for 30 minutes, and then the mixture was subjected to a dispersion treatment under the following conditions:

Dispersing apparatus: Sand grinder (made by Igarashi Kikai)

Grinding media:: Zirconium beads, 1 mm in diameter

Packing ratio of grinding media: 50% (by volume)

Grinding time: 5 hours

Then, the mixture was further subjected to a centrifugation treatment (12,000 rpm for 20 minutes) to remove coarse particles and obtain a dispersion.

Preparation of ink

| | |
|---|---|
| The thus obtained dispersion | 30 parts |
| Dye (A-3) | 1.5 parts |
| Glycerine | 5 parts |
| Diethylene glycol | 9.5 parts |
| Ethanol | 1.5 parts |
| Polyethylene glycol (PEG 300) | 10 parts |
| Deionized water | 35.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 4

A black ink was prepared in the same manner as in Example 1, except that dye (A-4) was used in place of the dye (A-1).

EXAMPLE 5

Preparation of pigment dispersion

| | |
|---|---|
| α-Methylstyrene-styrene-acrylic acid copolymer (acid value: 130; average molecular weight: 13,000) | 6 parts |
| Aminomethylpropanol | 3 parts |
| Deionized water | 61 parts |
| Ethylene glycol | 5 parts |

The foregoing components were mixed together and heated at 70° C. on water bath to completely dissolve the resin. Then, 18 parts of carbon black (MCF-88, made by Mitsubishi Kasei Kogyo Kabushiki Kaisha) and 7 parts of ethanol were added to the solution, and the mixture was premixed for 30 minutes and then subjected to a dispersion treatment under the following conditions:

Dispersing apparatus: Sand grinder (made by Igarashi Kikai)
Grinding media: Zirconium beads, 2 mm in diameter
Packing ratio of grinding media: 40% (by volume)
Grinding time: 3 hours The mixture was further subjected to a centrifugation treatment (12,000 rpm for 20 minutes) to remove coarse particles and obtain a dispersion.

Preparation of ink

| The thus obtained dispersion: | 50 parts |
|---|---|
| Dye (A-4) | 1.5 parts |
| Glycerine | 3 parts |
| Diethylene glycol | 11.5 parts |
| Ethanol | 1.5 parts |
| Polyethylene glycol (PEG 300) | 10 parts |
| Deionized water | 22.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 6

Preparation of pigment dispersion

| Styrene-maleic anhydride-maleic acid half ester copolymer (acid value: 205; average molecular weight: 7,000): | 6 parts |
|---|---|
| Monoethanolamine | 2 parts |
| Deionized water | 62 parts |
| Ethylene glycol | 5 parts |

The foregoing components were mixed together and heated at 70° C. on water bath to completely dissolve the resin. Then, 18 parts of carbon black (MCF-88, made by Mitsubishi Kasei Kogyo Kabushiki Kaisha) and 7 parts of ethanol were added to the solution and the mixture was premixed for 30 minutes and then subjected to a dispersion treatment under the following conditions:

Dispersing apparatus: Sand grinder (made by Igarashi Kikai)
Grinding media: Zirconium beads, 1 mm in diameter
Packing ratio of grinding media: 60% (by volume)
Grinding time: 4 hours The mixture was further subjected to a centrifugation treatment (12,000 rpm for 20 minutes) to remove coarse particles and obtain a dispersion.

Preparation of ink

| The thus prepared dispersion | 50 parts |
|---|---|
| Dye (A-2) | 1.5 parts |
| Diethylene glycol | 10 parts |
| Ethanol | 1.5 parts |
| Polyethylene glycol (PEG 300) | 10 parts |
| Deionized water | 27 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 7

Preparation of pigment dispersion

| Styrene-acrylic acid-ethyl acrylate copolymer (acid value: 174; average molecular weight: 18,000) | 2 parts |
|---|---|
| Monoethanolamine | 1 part |
| Deionized water | 69 parts |
| Ethylene glycol | 5 parts |

The foregoing components were mixed together and heated at 70° C. on water bath to completely dissolve the resin. Then, 18 parts of carbon black (MCF-88, made by Mitsubishi Kasei Kogyo Kabushiki Kaisha) and 5 parts of ethanol were added to the solution and the mixture was premixed for 30 minutes and then subjected to a dispersion treatment under the following conditions:

Dispersing apparatus: Sand grinder (made by Igarashi Kikai)
Grinding media: Glass beads, 0.5 mm in diameter
Packing ratio of grinding media: 60% (by volume)
Grinding time: 3 hours The mixture was further subjected to a centrifugation treatment (12,000 rpm for 20 minutes) to remove coarse particles and obtain a dispersion.

Preparation of Ink

| The thus prepared dispersion | 30 parts |
|---|---|
| Dye (A-1) | 1.5 parts |
| Diethylene glycol | 10 parts |
| Ethanol | 1.5 parts |
| Polyethylene glycol (PEG 300) | 10 parts |
| Deionized water | 27 parts |

The foregoing components excluding the dispersion were mixed together and stirred. After the complete dissolution of the dye, the predetermined amount of the dispersion was added thereto, and the mixture was stirred for one hour to obtain an ink.

COMPARATIVE EXAMPLE 1

A black ink was prepared in the same manner as in Example 1, except no such dye as in Example 1 was used and 10 parts of carbon black was used and subjected to the dispersion treatment.

COMPARATIVE EXAMPLE 2

A black ink was prepared in the same manner as in Example 2, except that Direct black 19 was used in place of the dye of Example 2 and subjected to the dispersion treatment.

COMPARATIVE EXAMPLE 3

A black ink was prepared in the same manner as in Example 1, except that no ethanol was used.

COMPARATIVE EXAMPLE 4

A black ink was prepared in the same manner as in Example 1, except that the dispersion resin, monoethanolamine and deionized water contained in the pigment dispersion were used in amounts of 9 parts, 2.5 parts and 58.5 parts.

The foregoing recording liquids were tested for the following properties by use of a recording apparatus of an on-demand type, multihead type capable of ejecting an ink by action of a heat energy (Desk jet printer made by Hewlett-Packard Co.). The results are given in the following Table 1.

T1: Fastness of printed product

Lightfastness

Printed samples each made with the thus prepared inks were exposed to a xenon fade meter (black panel, 63° C. 75% humidity) for 100 hours to measure changes in chromaticity before and after the exposure (color difference: a distance on the chromaticity coordinates of changes in the chromaticity by CIE Lab colorimetry before and after the exposure).

Waterfastness

Printed samples were dipped in tap water for 5 minutes to measure changes in the optical density of the printed samples before and after the dipping.

T2: Optical density of printed products

Optical densities of the printed products were measured by a Macbeth densitometer (RD918).

T3: Clogging during the reprinting after a short discontinuation of printing Clogging during the reprinting after a short discontinuation of printing was determined by filling a test ink in a printer, continuously printing Roman letters and numbers for 10 minutes, discontinuing the printing, leaving the printer to stand in e.g., an uncapped state (20° C.±5° C.; 50±10% RH) for 10 minutes and again printing Roman letters and numbers to inspect the presence of failures such as blurs or breakings in the printed letters or numbers.

Mark "O": no failure at all at the first letter and so on

Mark "Δ": blurs or breaking in parts at the first letter and so on

Mark "X": complete failure to print even at the first letter

T4: Recovery from clogging during the reprinting after a long discontinuation of printing Recovery from clogging during the reprinting after a long discontinuation of printing was determined by filling a test ink in a printer, continuously printing Roman letters and numbers for 10 minutes, discontinuing the printing, leaving the printer to stand in an uncapped state (60° C., 10±5% RH) for 7 days, and conducting recovery operations from nozzle clogging to find how many operations were required for printing normal letters free from blurs or breaking.

Mark "O": normal letters were printable by 1 to 5 recovery operations

Mark "Δ": normal letters were printable by 6 to 9 recording operations

Mark "X": normal letters were printable by 11 or more recovery operations

T5: Election stability

Continuous ejection of the test inks was carried out in the atmosphere both at 5° C. and 40° C. to determine the time required until an ejection failure took place.

T6: Hue of printed products

Chromaticity of printed samples with the thus obtained inks was measured by C1-35 (made by Murakami Shikisai Gijutsu Kenkyu-Sho) to determine $L^*$, $a^*$, and $b^*$. $L^*$, $a^*$ and $b^*$ are perceptivity indice defined in CIE1976 ($L^*$, $a^*$, and $b^*$) space.

To: Residual (dissolved) resin concentration

Residual resin concentration was determined by centrifuging the thus obtained inks at 5,500 rpm for 5 hours in an ultra-high speed cooling centrifuge (made by Beckmann Corp.) to precipitate the pigment and the resin adsorbed on the pigment, sampling a predetermined amount of the supernatant solution, drying and solidifying the sample at 60° C. for 24 hours in a vacuum drier and calculating a percentage of the amount of the thus obtained resin to the charged ink as a residual resin concentration.

The results of evaluations are shown in the following Table 1, where the light resistance of T1 shows the respective color differences, the water resistance of T2 shows the percentage of residual coloring matters calculated from the optical densities of the printed products before and after the dipping and T2 shows the density of reflectance of the printed products.

TABLE 1

| | $T_1$ | | | | | | $T_6$ | | | |
|---|---|---|---|---|---|---|---|---|---|---|
| | Light fastness | Water-fastness | $T_2$ | $T_3$ | $T_4$ | $T_5$ | $L^*$ | $a^*$ | $b^*$ | $T_0$ |
| Ex. 1 | 1.2 | 94% | 1.35 | o | o | 25 hours or more 50 hours or more | 29.0 | 0.31 | 0.05 | 0.2 |
| Ex. 2 | 1.2 | 95% | 1.36 | o | o | 25 hours or more 50 hours or more | 28.8 | 0.20 | −0.10 | 0.2 |
| Ex. 3 | 2.0 | 90% | 1.32 | o | o | 25 hours or more 50 hours or more | 29.5 | 0.50 | −0.31 | 0.3 |

TABLE 1-continued

| | $T_1$ | | | | | | $T_6$ | | | |
|---|---|---|---|---|---|---|---|---|---|---|
| | Light fastness | Water-fastness | $T_2$ | $T_3$ | $T_4$ | $T_5$ | L* | a* | b* | $T_0$ |
| Ex. 4 | 1.0 | 96% | 1.33 | ○ | ○ | 25 hours or more 50 hours or more | 29.2 | −0.31 | −2.5 | 0.3 |
| Ex. 5 | 0.9 | 96% | 1.32 | ○ | ○ | 25 hours or more 50 hours or more | 29.5 | −0.51 | −3.0 | 0.6 |
| Ex. 6 | 1.3 | 95% | 1.35 | ○ | ○ | 25 hours or more 50 hours or more | 28.9 | 0.01 | −0.20 | 0.5 |
| Ex. 7 | 1.6 | 90% | 1.30 | ○ | ○ | 25 hours or more 50 hours or more | 30.8 | 0.01 | −0.35 | 0.02 |
| Comp. Ex. 1 | 0.3 | 100% | 1.15 | ○ | ○ | 25 hours or more 50 hours or more | 38.6 | 2.65 | 2.10 | 0.1 |
| Comp. Ex. 2 | 0.5 | 100% | 1.19 | ○ | Δ | 8 hours or more 30 hours or more | 38.3 | 3.51 | 2.58 | 0.2 |
| Comp. Ex. 3 | 1.2 | 94% | 1.35 | ○ | ○ | No stable discharge | 35.6 | 0.28 | 0.51 | 0.3 |
| Comp. Ex. 4 | ✳ | ✳ | ✳ | ✳ | ✳ | No stable discharge | ✳ | ✳ | ✳ | 3.1 |

Remarks: Sheets used for printing: Xerox 4024 paper sheets
$T_5$: Upper value at 5° C.; Lower value at 40° C.
✳: No measurable print sample was obtained due to unstable ejection.

EXAMPLE 8

Preparation of pigment dispersion

| | |
|---|---|
| Styrene-maleic acid-methyl methacrylate copolymer (acid value: 155; average molecular weight: 13,000) | 4 parts |
| Monoethanolamine | 2 parts |
| Deionized water | 64 parts |
| Ethylene alycol | 5 parts |

The foregoing components were mixed together and heated at 70° C. on a water bath to completely dissolve the resin. When the concentration of the resin to be dissolved was low, the dissolution was sometimes incomplete, and thus a resin solution of high concentration may be prepared in advance and adjusted to a desired concentration upon dilution to attain complete dissolution of the resin. 20 parts of carbon black (MCF-88, made by Mitsubishi Kasei Kogyo Kabushiki Kaisha) and 5 parts of ethanol were added to the solution, and the mixture was premixed for 30 minutes and then subjected to a dispersion treatment under the following conditions:

Dispersing apparatus: Pearl mill (made by Asizawa)
Grinding media: glass beads, 0.8–1.2 mm in diameter
Packing ratio of grinding media: 50% (by volume)
Ejection rate: 100 ml/min.

The mixture was further subjected to a centrifugation treatment (12,000 rpm for 15 minutes) to remove coarse particles and obtain a dispersion.

Preparation of ink

| | |
|---|---|
| The thus obtained dispersion | 50 parts |
| Dye (B-1) | 1.5 parts |
| Glycerine | 5 parts |
| Ethylene glycol | 2.5 parts |
| Ethanol | 4.5 parts |
| Diethylene glycol | 10 parts |
| Deionized water | 26.5 parts |

The foregoing components excluding the dispersion were mixed together and stirred. After the complete dissolution of the dye, the predetermined amount of the dispersion was added thereto, and the mixture was stirred for one hour to obtain an ink.

EXAMPLE 9

In place of 1.5 parts of the dye (B-1) in Example 8, the same dye was subjected to acidic precivitation treatment with a hydrochloric acid solution and neutralized with lithium hydroxide. The thus obtained solution was dried to solidification to obtain a dye. 1.5 parts of the thus obtained dye was used in the ink composition of Example 8 and a black ink was obtained by dispersion and centrifugation in the same manner as in Example 8.

EXAMPLE 10

Preparation of pigment dispersion

| | |
|---|---|
| α-Methylstyrene-styrene-acrylic acid copolymer (acid value: 195; average molecular weight: 17,000) | 4 parts |

-continued

| Aminomethylpropanol | 2 parts |
|---|---|
| Deionized water | 65.5 parts |
| Diethylene glycol | 5 parts |
| Nikkol BL-9EX (made by Nikko Chemicals) | 0.5 parts |

The foregoing components were mixed together and heated at 70° C. on water bath to completely dissolve the resin. 16 parts of carbon black (MA-100, made by Mitsubishi Kasei Kogyo Kabushiki Kaisha) and 7 parts of ethanol were added to the solution and the mixture was premixed for 30 minutes and then subjected to a dispersion treatment under the following conditions:

Dispersing apparatus: Sand grinder (made by Igarashi Kikai)
Grinding media: Zirconium beads, 1 mm in diameter
Packing ratio of grinding media: 50% (by volume)
Grinding time: 5 hours The mixture was further subjected to a centrifugation treatment (12,000 rpm for 20 minutes) to remove coarse particles and obtain a dispersion.

Preparation of ink

| The thus obtained dispersion | 50 parts |
|---|---|
| Dye (B-3) | 1.5 parts |
| Glycerine | 5 parts |
| Diethylene glycol | 7.5 parts |
| Ethanol | 1.5 parts |
| Polyethylene glycol (PEG 300) | 5 parts |
| Deionized water | 29.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 11

Preparation of pigment dispersion

| Styrene-maleic acid-methyl methacrylate copolymer (acid value: 155; average molecular weight: 13,000) | 6 parts |
|---|---|
| Monoethanolamine | 3 parts |
| Deionized water | 61 parts |
| Ethylene glycol | 5 parts |

The foregoing components were mixed together and heated at 70° C. on water bath to completely dissolve the resin. When the concentration of the resin to be dissolved was low, the dissolution was sometimes incomplete, and thus a resin solution of high concentration may be prepared in advance and adjusted to a desired concentration upon dilution to attain complete dissolution of the resin. 20 parts of carbon black (MCF-88, made by Mitsubishi Kasei Kogyo Kabushiki Kaisha) and 5 parts of ethanol were added to the solution, and the mixture was premixed for 30 minutes and then subjected to a dispersion treatment under the following conditions:

Dispersing apparatus: Sand grinder (made by Igarashi Kikai)
Grinding media: Zirconium beads, 2 mm in diameter
Packing ratio of grinding media: 40% (by volume)
Grinding time: 5 hours The mixture was further subjected to a centrifuge treatment (12,000 rpm for 20 minutes) to remove coarse particles and obtain a dispersion.

Preparation of ink

| The thus obtained dispersion | 40 parts |
|---|---|
| Dye (B-1) | 1.5 parts |
| Glycerine | 5 parts |
| Diethylene glycol | 7.5 parts |
| Ethanol | 1.5 parts |
| Polyethylene glycol (PEG 300) | 5 parts |
| Deionized water | 39.5 parts |

The foregoing components excluding the dispersion were mixed together and stirred. After the complete dissolution of the dye, the predetermined amount of the dispersion was added thereto, and the mixture was stirred to obtain an ink.

EXAMPLE 12

Preparation of pigment dispersion

| α-Methylstyrene-styrene-acrylic acid-butyl acrylate copolymer (acid value: 155; average molecular weight: 14,500) | 6 parts |
|---|---|
| Monoethanolamine | 2 parts |
| Deionized water | 57 parts |
| Ethylene glycol | 5 parts |

The foregoing components were mixed together and heated at 70° C. on water bath to completely dissolve the resin. When the concentration of the resin to be dissolved was low, the dissolution was sometimes incomplete, and thus a resin solution of high concentration may be prepared in advance and adjusted to a desired concentration upon dilution to attain complete dissolution. 20 parts of carbon black (MCF-88, made by Mitsubishi Kasei Kogyo Kabushiki Kaisha) and 5 parts of ethanol were added to the solution and the mixture was premixed for 30 minutes and then subjected to a dispersion treatment under the following conditions:

Dispersing apparatus: Sand grinder (made by Igarashi Kikai)
Grinding media: Glass beads, 1 mm in diameter
Packing ratio of grinding media: 50% (by volume)
Grinding time: 3 hours The mixture was further subjected to a centrifugation treatment (12,000 rpm for 20 minutes) to remove coarse particles and obtain a dispersion.

Preparation of ink

| The thus obtained dispersion | 45 parts |
|---|---|
| Dye (B-2) | 1.5 parts |
| Glycerine | 5 parts |
| Diethylene glycol | 12.5 parts |
| Ethanol | 1.5 parts |
| Deionized water | 34.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 13

Preparation of pigment dispersion

| | |
|---|---|
| Styrene-maleic acid-methyl methacrylate copolymer (acid value: 155; average molecular weight: 13,000) | 2 parts |
| Monoethanolamine | 1 part |
| Deionized water | 72 parts |
| Diethylene glycol | 5 parts |

The foregoing components were mixed together and heated at 70° C. on water bath to completely dissolve the resin. When the concentration of the resin to be dissolved was low, the dissolution was sometimes incomplete and thus a resin solution of high concentration may be prepared in advance and adjusted to a desired concentration upon dilution to attain complete dissolution. 15 parts of carbon black (MCF-88, made by Mitsubishi Kasei Kogyo Kabushiki Kaisha) and 5 parts of ethanol were added to the solution and the mixture was premixed for 30 minutes and then subjected to a dispersion treatment under the following conditions:

Dispersing apparatus: Sand grinder (made by Igarashi Kikai)
Grinding media: Zirconium beads, 1 mm in diameter
Packing ratio of grinding media: 50% (by volume)
Grinding time: 5 hours The mixture was further subjected to a centrifugation treatment (12,000 rpm for 20 minutes) to remove coarse particles and obtain a dispersion.

Preparation of ink

| | |
|---|---|
| The thus obtained dispersion | 30 parts |
| Dye (B-3) | 1.5 parts |
| Diethylene glycol | 7.5 parts |
| Ethanol | 1.5 parts |
| Polyethylene glycol (PEG 300) | 10 parts |
| Deionized water | 49.5 parts |

The foregoing components excluding the dispersion were mixed together and stirred. After the complete dissolution of the dye, the predetermined amount of the dispersion was added thereto, and the mixture was stirred for one hour to obtain an ink.

EXAMPLE 14

Preparation of pigment dispersion

| | |
|---|---|
| Styrene-maleic acid-methyl methacrylate copolymer (acid value: 155; average molecular weight: 13,000) | 5 parts |
| Monoethanolamine | 2 parts |
| Deionized water | 63 parts |
| Ethylene glycol | 5 parts |

The foregoing components were mixed together and heated at 70° C. on water bath to completely dissolve the resin. When the concentration of the resin to be dissolved was low, the dissolution was sometimes incomplete, and thus a resin solution of high concentration may be prepared in advance and adjusted to a desired concentration upon dilution to attain complete dissolution. 20 parts of carbon black (MCF-88, made by Mitsubishi Kasei Kogyo Kabushiki Kaisha) 5 parts of ethanol were added to the solution and the mixture was premixed for 30 minutes and then subjected to a dispersion treatment under the following conditions:

Dispersing apparatus: Pearl mill (made by Asizawa Kabushiki Kaisha)
Grinding medium: Glass beads, 0.8–1.2 mm in diameter
Packing ratio of grinding medium: 50% (by volume)
Discharge rate: 100 ml/min The mixture was further subjected to a centrifugation treatment (12,000 rpm for 15 minutes) to remove coarse particles and obtain a dispersion.

Preparation of ink

| | |
|---|---|
| The thus obtained dispersion | 40 parts |
| Dye (C-1) | 1.5 parts |
| Glycerine | 5 parts |
| Ethylene glycol | 3 parts |
| Ethanol | 5 parts |
| Diethylene glycol | 10 parts |
| Deionized water | 35.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 15

In place of 1.5 parts of the dye (C-1) in the composition of Example 14, the same dye was subjected to an acidic precipitation treatment with a hydrochloric acid solution and neutralized with lithium hydroxide. The solution was dried to solidification and a dye was obtained. 1.5 parts of the thus obtained dye was used in the composition of Example 14 and a black ink was obtained by dispersion and centrifugation in the same manner as in Example 14.

EXAMPLE 16

Preparation of pigment dispersion

| | |
|---|---|
| α-methylstyrene-styrene-acrylic acid copolymer (acid value: 195; average molecular weight: 17,000) | 4 parts |
| Aminomethylpropanol | 2 parts |
| Deionized water | 65.5 parts |
| Diethylene glycol | 5 parts |
| Nikkol BL-9EX (made by Nikko Chemicals) | 0.5 parts |

The foregoing components were mixed together and heated at 70° C. on water bath to completely dissolve the resin. Then, 16 parts of carbon black (MA-100, made by Mitsubishi Kasei Kogyo Kabushiki Kaisha) and 7 parts of ethanol were added to the solution and the mixture was mixed for 30 minutes and then subjected to a dispersion treatment under the following conditions:

Dispersing apparatus: Sand grinder (made by Igarashi Kikai)
Grinding media: Zirconium beads, 1 mm in diameter
Packing ratio of grinding media: 50% (by volume)
Grinding time: 5 hours The mixture was further subjected to a centrifugation treatment (12,000 rpm for 20 minutes) to remove coarse particles and obtain a dispersion.

Preparation of ink

| | |
|---|---|
| The thus obtained dispersion | 50 parts |
| Dye (C-3) | 1.5 parts |
| Glycerine | 5 parts |
| Diethylene glycol | 7.5 parts |
| Ethanol | 1.5 parts |
| Polyethylene glycol (PEG 300) | 5 parts |
| Deionized water | 29.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 17

Preparation of pigment dispersion

| | |
|---|---|
| Styrene-maleic acid-methyl methacrylate copolymer (acid value: 165; average molecular weight: 8,200) | 7 parts |
| Monoethanolamine | 3 parts |
| Deionized water | 60 parts |
| Ethylene glycol | 5 parts |

The foregoing components were mixed together and heated at 70° C. on water bath to completely dissolve the resin. When the concentration of the resin was low, the dissolution was sometimes incomplete and thus a resin solution of high concentration may be prepared in advance and adjusted to a desired concentration upon dilution to attain complete dissolution. Then, 20 parts of carbon black (MCF-88, made by Mitsubishi Kasei Kogyo Kabushiki Kaisha) and 5 parts of ethanol were added to the solution and the mixture was premixed for 30 minutes and then subjected to a dispersion treatment under the following conditions:

Dispersing apparatus: Sand grinder (made by Igarashi Kikai)

Grinding media: Zirconium beads, 2 mm in diameter

Packing ratio of grinding media: 40% (by volume)

Grinding time: 3 hours

The mixture was further subjected to a centrifugation treatment (12,000 rpm for 20 minutes) to remove coarse particles and obtain a dispersion.

Preparation of ink

| | |
|---|---|
| The thus obtained dispersion | 40 parts |
| Dye (C-1) | 1.5 parts |
| Diethylene glycol | 12.5 parts |
| Ethanol | 1.5 parts |
| Polyethylene glycol (PEG 300) | 5 parts |
| Deionized water | 39.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 18

Preparation of pigment dispersion

| | |
|---|---|
| Styrene-acrylic acid-methyl methacrylate copolymer (acid value: 180; average molecular weight: 10,000) | 6 parts |
| Monoethanolamine | 2 parts |
| Deionized water | 64 parts |
| Ethylene glycol | 5 parts |

The foregoing components were mixed together and heated at 70° C. on water bath to completely dissolve the resin. When the concentration of the resin to be dissolved was low, the dissolution was sometimes incomplete, and thus a resin solution of high concentration may be prepared in advance and adjusted to a desired concentration upon dilution to attain complete dissolution. Then, 20 parts of carbon black (MCF-88, made by Mitsubishi Kasei Kogyo Kabushiki Kaisha) and 5 parts of ethanol were added to the solution and the mixture was premixed for 30 minutes and then subjected to a dispersion treatment under the following conditions:

Dispersing apparatus: Sand grinder (made by Igarashi Kikai)

Grinding media: Glass beads, 1 mm in diameter

Packing ratio of grinding media: 50% (by volume)

Grinding time: 3 hours

The mixture was further subjected to a centrifugation treatment (12,000 rpm for 20 minutes) to remove coarse particles and obtain a dispersion.

Preparation of ink

| | |
|---|---|
| The thus obtained dispersion | 50 parts |
| Dye (C-2) | 1.5 parts |
| Diethylene glycol | 12.5 parts |
| Ethanol | 1.5 parts |
| Polyethylene glycol (PEG 300) | 5 parts |
| Deionized water | 29.5 parts |

The foregoing components excluding the dispersion were mixed together and stirred. After the complete dissolution of the dye, the predetermined amount of the dispersion was added thereto and the mixture was stirred for one hour to obtain an ink.

EXAMPLE 19

Preparation of pigment dispersion

| | |
|---|---|
| Styrene-acrylic acid-butyl acrylate copolymer (acid value: 179; average molecular weight: 18,000) | 2 parts |
| Monoethanolamine | 2 parts |
| Deionized water | 70 parts |
| Ethylene glycol | 5 parts |

The foregoing components were mixed together and heated at 70° C. on water bath to completely dissolve the resin. When the concentration of the resin to be dissolved was low, the dissolution was sometimes incomplete, and thus a resin solution of high concentration may be prepared in advance and adjusted to a desired concentration upon dilution to attain complete dissolution. Then, 16 parts of carbon black (MCF-88, made by Mitsubishi Kasei Kogyo Kabushiki Kaisha) and 5 parts of ethanol were added to the solution and the mixture was premixed for 30 minutes and then subjected to a dispersion treatment under the following conditions:

Dispersing apparatus: Sand grinder (made by Igarashi Kikai)
Grinding media: Zirconium beads, 1 mm in diameter
Packing ratio of grinding media: 50% (by volume)
Grinding time: 5 hours The mixture was further subjected to a centrifugation treatment (12,000 rpm for 20 minutes) to remove coarse particles and obtain a dispersion.

Preparation of ink

| The thus obtained dispersion | 30 parts |
|---|---|
| Dye (C-3) | 1.5 parts |
| Glycerine | 5 parts |
| Diethylene glycol | 7.5 parts |
| Isopropyl alcohol | 1.5 parts |
| Polyethylene glycol (PEG 300) | 5 parts |
| Deionized water | 29.5 parts |

The foregoing components excluding the dispersion were mixed together and stirred. After the complete dissolution of the dye, the predetermined amount of the dispersion was added thereto, and the mixture was stirred for one hour to obtain an ink.

The recording liquids prepared in the foregoing Examples 8 to 19 were subjected to test to investigate $T_1$ to $T_5$ in the same manner as in Examples 1 to 7 and comparative Examples 1 to 3. The results are shown in Table 2.

In $T_1$, marking resistance was additionally evaluated.

Marking resistance

Printed samples were traced with a commercially available marking pen (fluorescent pen) to evaluate the degree of fouling of the printed products.

Mark "O": no fouling such as trailing edges, etc. at all on the printed surface
Mark "X": Serious trailing edges on the printed surface and serious fouling of the printed products As can be apparent from the foregoing, the present invention provides a recording liquid capable of producing printed products of high fastness and high print density and also provides a recording liquid capable of being ejected constantly stably even for a prolonged ejection with less clogging at the printer and a good preservation stability.

TABLE 2

| | $T_1$ | | | | | | | |
|---|---|---|---|---|---|---|---|---|
| | Light-fastness | Water-fastness | Marking resistance | $T_2$ | $T_3$ | $T_4$ | $T_5$ | $T_o$ |
| Ex. 8 | 1.3 | 100% | o | 1.38 | o | o | 25 hours or more 50 hours or more | 0.2 |
| Ex. 9 | 1.4 | 100% | o | 1.38 | o | o | 25 hours or more 50 hours or more | 0.2 |
| Ex. 10 | 1.2 | 100% | o | 1.32 | o | o | 25 hours or more 50 hours or more | 0.3 |
| Ex. 11 | 1.3 | 100% | o | 1.33 | o | o | 25 hours or more 50 hours or more | 0.5 |
| Ex. 12 | 1.4 | 100% | o | 1.32 | o | o | 25 hours or more 50 hours or more | 0.6 |
| Ex. 13 | 1.2 | 100% | o | 1.33 | o | o | 25 hours or more 50 hours or more | 0.03 |
| Ex. 14 | 1.4 | 98% | o | 1.33 | o | o | 25 hours or more 50 hours or more | 0.3 |
| Ex. 15 | 1.4 | 99% | o | 1.33 | o | o | 25 hours or more 50 hours or more | 0.3 |
| Ex. 16 | 1.6 | 97% | o | 1.32 | o | o | 25 hours or more 50 hours or more | 0.2 |
| Ex. 17 | 1.4 | 98% | o | 1.33 | o | o | 25 hours or more 50 hours or more | 0.5 |
| Ex. 18 | 1.4 | 99% | o | 33 | o | o | 25 hours or more 50 hours or more | 0.8 |
| Ex. 19 | 1.35 | 95% | o | 1.31 | o | o | 25 hours or more 50 hours or more | 0.02 |

I claim:

1. A recording liquid which comprises carbon black, a water-soluble resin, a water-soluble organic solvent including polyhydric alcohol and/or its alkyl ether and an aliphatic monohydric alcohol, and water, wherein the amount of the dissolved water-soluble resin which is in a liquid medium without being adsorbed on a pigment in said recording liquid is not more than 2% by weight and the recording liquid further contains at least one of the dyes represented by the following general formulae (A) to (C):

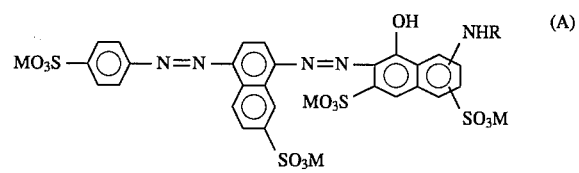

wherein R is —H, —COCH$_3$,

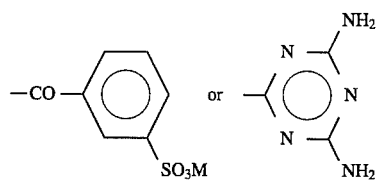

and M is Na, Li, K or ammonium;

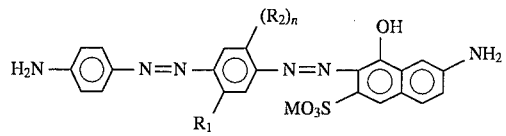

wherein $R_1$ and $R_2$ are independently selected from —$OCH_3$, —$CH_3$, —$NH_2$ and —$NHCOCH_3$, n is 0 or 1 and M is Na, Li, K, or ammonium; and

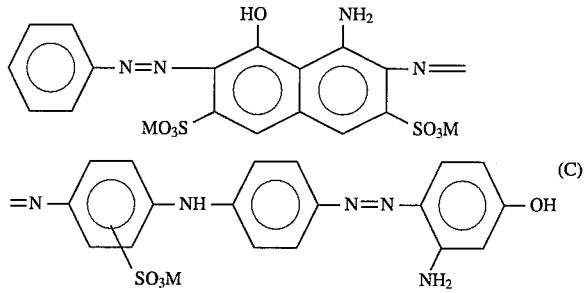

wherein M is Na, K, Li or ammonium.

2. A recording liquid according to claim 1, wherein the content of the carbon black is in the range of 3 to 20% by weight on the basis of the total weight of the recording liquid.

3. A recording liquid according to claim 1, wherein the content of the dye is in the range of 0.5 to 2.0% by weight on the basis of the total weight of the recording liquid.

4. A recording liquid according to claim 1, wherein the content of the aliphatic monohydric alcohol is in the range of 3 to 15% by weight on the basis of the total weight of the recording liquid.

5. A recording liquid according to claim 1, wherein the content of the polyhydric alcohol and/or its alkyl ether is in the range of 10 to 15% by weight on the basis of the total weight of the recording liquid.

6. A recording liquid according to claim 1, wherein the aliphatic monohydric alcohol is ethyl alcohol.

7. A method for ink jet recording, which comprises ejecting a recording liquid as liquid droplets from fine orifices by endowing the recording liquid with heat energy, the recording liquid comprising carbon black, a water-soluble resin, a water-soluble organic solvent including polyhydric alcohol and/or its alkyl ether and an aliphatic monohydric alcohol, and water, the amount of the dissolved water-soluble resin which is in a liquid medium without being adsorbed on a pigment in said recording liquid being not more than 2% by weight and the recording liquid further containing at least one of the dyes represented by the following general formulae (A) to (C):

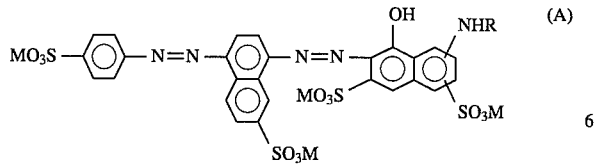

wherein R is —H, —$COCH_3$,

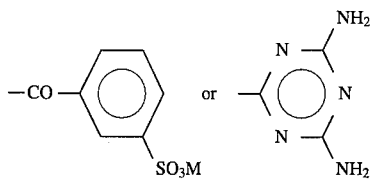

and M is Na, Li, K or ammonium;

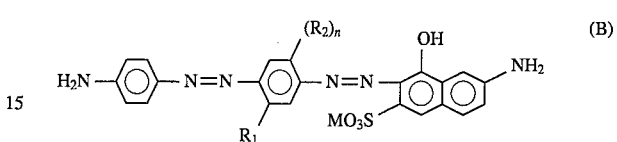

wherein $R_1$ and $R_2$ are independently selected from —$OCH_3$, —$CH_3$, —$NH_2$ and —$NHCOCH_3$, n is 0 or 1 and M is Na, Li, K, or ammonium; and

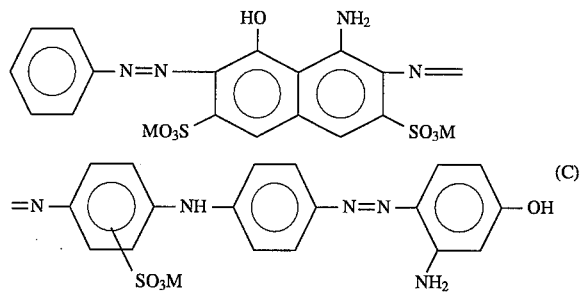

wherein M is Na, K, Li or ammonium.

8. A method according to claim 7, wherein the content of the carbon black is in the range of 3 to 20% by weight on the basis of the total weight of the recording liquid.

9. A method according to claim 7, wherein the content of the dye is in the range of 0.5 to 2.0% by weight on the basis of the total weight of the recording liquid.

10. A method according to claim 7, wherein the content of the aliphatic monohydric alcohol is in the range of 3 to 15% by weight on the basis of the total weight of the recording liquid.

11. A method according to claim 7, wherein the content of the polyhydric alcohol and/or its alkyl ether is in the range of 10 to 50% by weight on the basis of the total weight of the recording liquid.

12. A method according to claim 7, wherein the aliphatic monohydric alcohol is ethyl alcohol.

13. A method according to claim 7, wherein the water-soluble resin has an acid value of 50 to 300.

14. A method according to claim 7, wherein the water-soluble resin has an acid value of 70 to 250.

15. A recording liquid which comprises carbon black, a water-soluble resin, a water-soluble organic solvent including polyhydric alcohol and/or its alkyl ether and an aliphatic monohydric alcohol, and water, wherein the water-soluble resin has an acid value of 50 to 300, the amount of the dissolved water-soluble resin which is in a liquid medium without being adsorbed on a pigment in said recording liquid is not more than 2% by weight and the recording liquid further contains at least one of the dyes represented by the following general formulae (A) to (C):

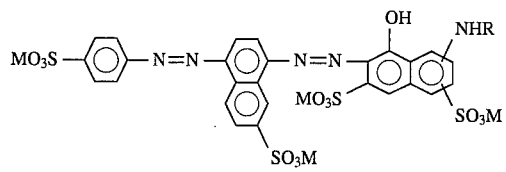

wherein R is —H, —COCH$_3$,

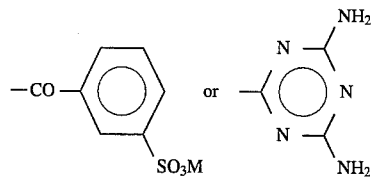

and M is Na, Li, K or ammonium;

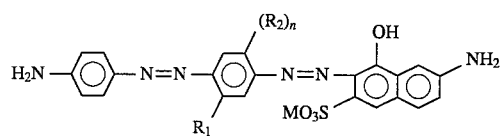

wherein R$_1$ and R$_2$ are independently selected from —OCH$_3$, —CH$_3$, —NH$_2$ and —NHCOCH$_3$, n is 0 or 1 and M is Na, Li, K, or ammonium; and

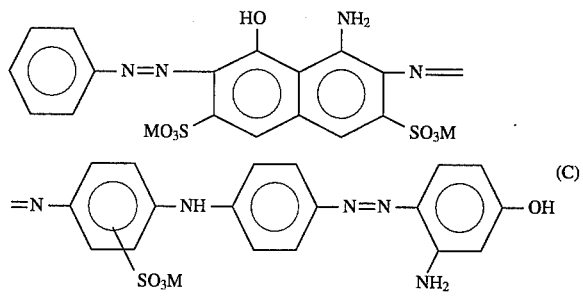

wherein M is Na, K, Li or ammonium.

16. A recording liquid according to claim 15, wherein the content of the carbon black is in the range of 3 to 20% by weight on the basis of the total weight of the recording liquid.

17. A recording liquid according to claim 15, wherein the content of the dye is in the range of 0.5 to 2.0% by weight on the basis of the total weight of the recording liquid.

18. A recording liquid according to claim 15, wherein the content of the aliphatic monohydric alcohol is in the range of 3 to 15% by weight on the basis of the total weight of the recording liquid.

19. A recording liquid according to claim 15, wherein the content of the polyhydric alcohol and/or its alkyl ether is in the range of 10 to 15% by weight on the basis of the total weight of the recording liquid.

20. A recording unit having an ink container for holding a recording liquid and a head portion for ejecting the recording liquid as liquid droplets, said recording liquid comprising carbon black, a water-soluble resin, a water-soluble organic solvent including polyhydric alcohol and/or its alkyl ether and an aliphatic monohydric alcohol, and water, wherein the amount of the dissolved water-soluble resin which is in a liquid medium without being adsorbed on a pigment in said recording liquid is not more than 2% by weight and the recording liquid further containing at least one of the dyes represented by the following general formulae (A) to (C):

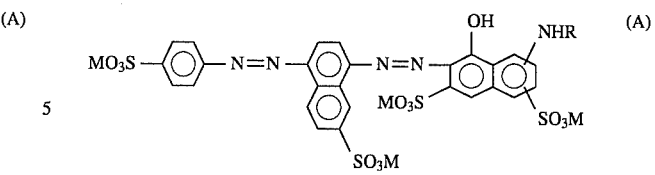

wherein R is —H, —COCH$_3$,

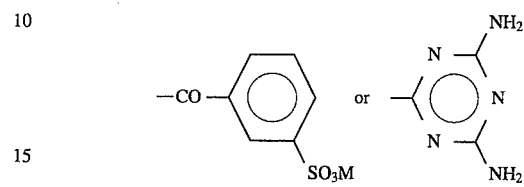

and M is Na, Li, K or ammonium;

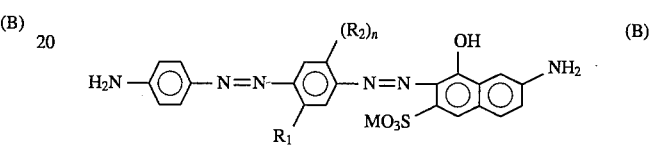

wherein R$_1$ and R$_2$ are independently selected from —OCH$_3$, —CH$_3$, —NH$_2$ and —NHCOCH$_3$, n is 0 or 1 and M is Na, Li, K, or ammonium; and

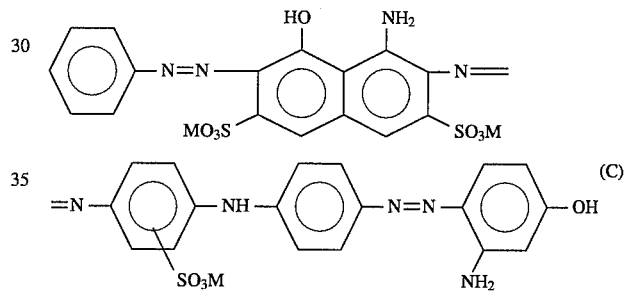

wherein M is Na, K, Li or ammonium.

21. A recording unit of claim 20, wherein the head portion ejects liquid droplets by the action of thermal energy on the recording liquid.

22. A recording unit of claim 20, wherein the ink container comprises an ink absorption member.

23. A recording unit of claim 20, wherein the ink absorption member is formed from polyurethane.

24. An ink cartridge having an ink container for holding a recording liquid, said recording liquid comprising carbon black, a water-soluble resin, a water-soluble organic solvent including polyhydric alcohol and/or its alkyl ether and an aliphatic monohydric alcohol, and water, wherein the amount of the dissolved water-soluble resin which is in a liquid medium without being adsorbed on a pigment in said recording liquid is not more than 2% by weight and the recording liquid further containing at least one of the dyes represented by the following general formulae (A) to (C):

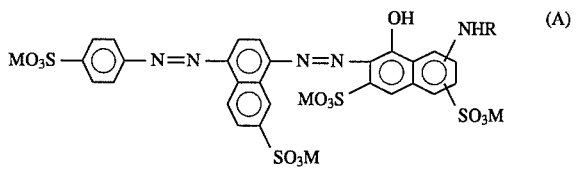

wherein R is —H, —COCH$_3$,

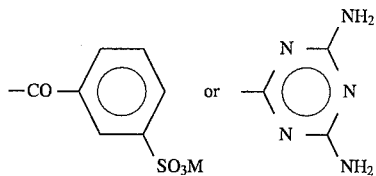

and M is Na, Li, K or ammonium;

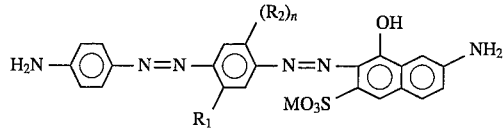

wherein R$_1$ and R$_2$ are independently selected from —OCH$_3$, —CH$_3$, —NH$_2$ and —NHCOCH$_3$, n is 0 or 1 and M is Na, Li, K, or ammonium; and

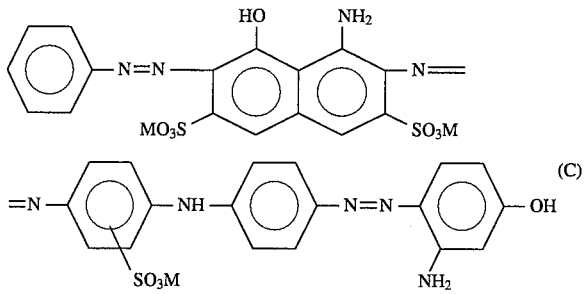

wherein M is Na, K, Li or ammonium.

25. An ink cartridge of claim 24, wherein the ink container is a bag structure.

26. An ink cartridge of claim 24, wherein the ink container has a liquid-contact face formed of polyolefin.

27. An ink-jet recording apparatus comprising a recording unit having an ink container for holding a recording liquid and a head portion for ejecting the recording liquid as liquid droplets, said recording liquid comprising carbon black, a water-soluble resin, a water-soluble organic solvent including polyhydric alcohol and/or its alkyl ether and an aliphatic monohydric alcohol, and water, wherein the amount of the dissolved water-soluble resin which is in a liquid medium without being adsorbed on a pigment in said recording liquid is not more than 2% by weight and said recording liquid further containing at least one of the dyes represented by the following general formulae (A) to (C):

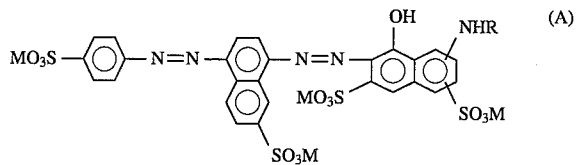

wherein R is —H, —COCH$_3$,

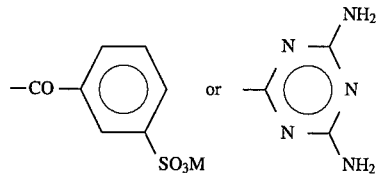

and M is Na, Li, K or ammonium;

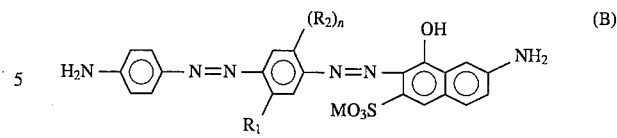

wherein R$_1$ and R$_2$ are independently selected from —OCH$_3$, —CH$_3$, —NH$_2$ and —NHCOCH$_3$, n is 0 or 1 and M is Na, Li, K, or ammonium; and

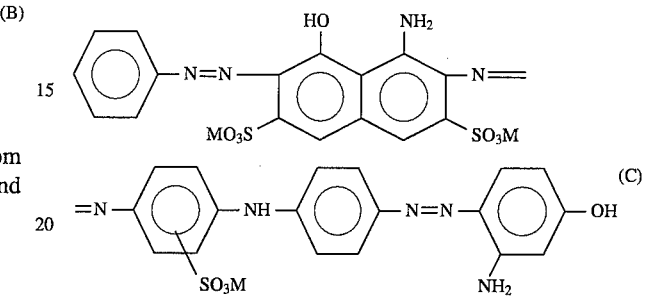

wherein M is Na, K, Li or ammonium.

28. An ink-jet recording apparatus of claim 27, wherein the head portion ejects liquid droplets by the action of thermal energy on the recording liquid.

29. An ink-jet recording apparatus of claim 27, wherein the ink container comprises an ink absorption member.

30. An ink-jet recording apparatus of claim 29, wherein the ink absorption member is formed from polyurethane.

31. An ink-jet recording apparatus comprising a recording head for ejecting the recording liquid as liquid droplets, an ink cartridge having an ink container for holding a recording liquid and an ink supplying portion for supplying the recording liquid to the recording head from the ink cartridge, said recording liquid comprising carbon black, a water-soluble resin, a water-soluble organic solvent including polyhydric alcohol and/or its alkyl ether and an aliphatic monohydric alcohol, and water, wherein the amount of the dissolved water-soluble resin which is in a liquid medium without being adsorbed on a pigment in said recording liquid is not more than 2% by weight and the recording liquid further containing at least one of the dyes represented by the following general formulae (A) to (C):

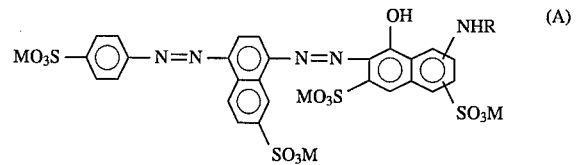

wherein R is —H, —COCH$_3$,

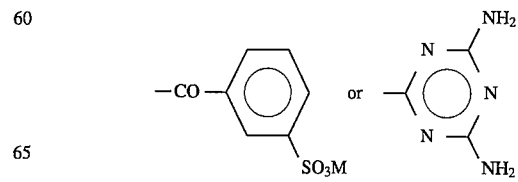

and M is Na, Li, K or ammonium;

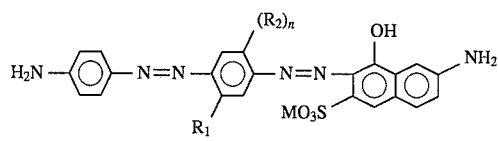

wherein $R_1$ and $R_2$ are independently selected from —$OCH_3$, —$CH_3$, —$NH_2$ and —$NHCOCH_3$, n is 0 or 1 and M is Na, Li, K, or ammonium; and

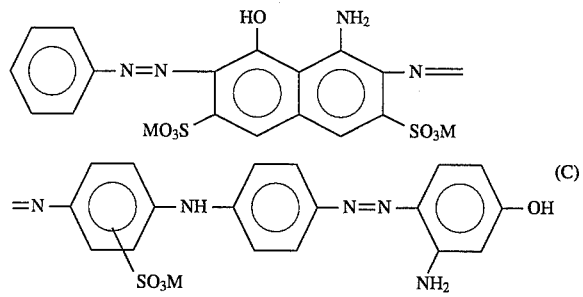

wherein M is Na, K, Li or ammonium.

32. An ink-jet recording apparatus of claim 31, wherein the recording head ejects liquid droplets by the action of thermal energy on the recording liquid.

33. An ink-jet recording apparatus of claim 31, wherein the ink container is a bag structure.

34. An ink-jet recording apparatus of claim 31, wherein the ink container has a liquid-contact face formed of polyolefin.

35. A recording liquid which comprises
   (1) carbon black,
   (2) a water-soluble dye,
   (3) a water-soluble resin,
   (4) a water-soluble organic solvent including a polyhydric alcohol and/or an alkyl ether thereof and an aliphatic monohydric alcohol, and
   (5) water, wherein the amount of the dissolved water-soluble resin which is in a liquid medium without being adsorbed on a pigment in said recording liquid is not more than 2% by weight.

* * * * *

UNITED STATES PATENT AND TRADEMARK OFFICE
CERTIFICATE OF CORRECTION

PATENT NO. : 5,604,276                    Page 1 of 3
DATED      : February 18, 1997
INVENTOR(S): YUKO SUGA It is certified that error appears in the above-indentified patent and that said Letters Patent is hereby corrected as shown below:

ON THE COVER PAGE ITEM:

[57] ABSTRACT

Line 2, "dyes" should read --dyes,--.

COLUMN 2

Line 28, "300" should read --300,--.

COLUMN 3

Line 34, "a" should read --an--.
Line 46, "When" should read --when--.
Line 58, "that" should read --so that--.

UNITED STATES PATENT AND TRADEMARK OFFICE
CERTIFICATE OF CORRECTION

PATENT NO. : 5,604,276  Page 2 of 3
DATED : February 18, 1997
INVENTOR(S) : YUKO SUGA It is certified that error appears in the above-indentified patent and that said Letters Patent is hereby corrected as shown below:

COLUMN 8

Line 58, "wag" should read --was--.

COLUMN 9

Comp. C-1), "$KO_3C$" should read --$KO_3S$--.

COLUMN 10

Line 62, "m and n have" should read --n has--; and "meanings" should read --meaning--.

COLUMN 11

Comp. (VII), "$(SO_3H)_n'$" should read --$(SO_3H)_n$--.

COLUMN 21

Line 44, "alycol" should read --glycol--.

UNITED STATES PATENT AND TRADEMARK OFFICE
CERTIFICATE OF CORRECTION

PATENT NO. : 5,604,276

DATED : February 18, 1997

INVENTOR(S) : YUKO SUGA

It is certified that error appears in the above-indentified patent and that said Letters Patent is hereby corrected as shown below:

COLUMN 25

Line 66, "5 parts" should read --and 5 parts--.

COLUMN 30

Table 2, in "Ex. 18", "33" should read --1.33--.

COLUMN 38

Line 9, "comprises" should read --comprises:--.

Signed and Sealed this

Ninth Day of September, 1997

Attest:

BRUCE LEHMAN

Attesting Officer

Commissioner of Patents and Trademarks